United States Patent [19]

Czerwiec et al.

[11] Patent Number: 5,301,050
[45] Date of Patent: Apr. 5, 1994

[54] SUBSCRIBER LOOP TESTING IN A FIBER-TO-THE-CURB COMMUNICATIONS NETWORK

[75] Inventors: Richard M. Czerwiec; Joseph E. Sutherland, both of Raleigh, N.C.

[73] Assignee: Alcatel Network Systems, Inc., Richardson, Tex.

[21] Appl. No.: 83,787

[22] Filed: Jun. 25, 1993

Related U.S. Application Data

[63] Continuation of Ser. No. 738,102, Jul. 30, 1991, abandoned.

[51] Int. Cl.⁵ .................... H04B 10/08; H04B 10/00
[52] U.S. Cl. .................................. 395/110; 359/125; 359/155; 359/173; 379/27; 379/29; 379/379; 370/13; 371/15.1
[58] Field of Search ............... 359/110, 125, 152, 113, 359/154, 155, 173; 379/2, 23, 24, 26, 27, 29, 30, 379; 371/2.1, 15; 370/13

[56] References Cited

U.S. PATENT DOCUMENTS

| | | | |
|---|---|---|---|
| 4,270,030 | 5/1981 | Brolin et al. | 379/27 |
| 4,438,298 | 3/1984 | Rubin | 379/25 |
| 4,451,916 | 4/1984 | Casper et al. | 359/110 |
| 4,467,147 | 8/1984 | Rubin | 379/25 |
| 4,581,493 | 4/1986 | Gazzo et al. | 379/12 |
| 4,639,557 | 1/1987 | Butler et al. | 379/29 |
| 4,663,775 | 5/1987 | Olek | 379/24 |
| 5,029,333 | 7/1991 | Graves et al. | 370/58.1 |
| 5,054,050 | 10/1991 | Burke et al. | 379/27 |
| 5,111,497 | 4/1992 | Bliven et al. | 379/27 |

Primary Examiner—Richard E. Chilcot, Jr.
Assistant Examiner—Rafael Bacares
Attorney, Agent, or Firm—Ware, Fressola, Van Der Sluys & Adolphson

[57] ABSTRACT

In fiber telecommunications network where an optical fiber is extended to the subscriber's neighborhood, mechanized loop testing is performed by a test unit located in a network unit in the subscriber's neighborhood. The test unit is responsive to commands from a controller located in the network unit to perform metallic line tests on the lines extending to the subscriber. Test results are stored in a memory associated with the controller in the network unit. Upon receipt of a test request from a central test controller, the controller within the network unit determines if there is sufficient time to perform the test; if so, a new test is performed and the results are conveyed back to the central test controller controller. If sufficient time is not available, the results of the last performed routine test contained in the memory are transmitted back to the central test controller. The test results sent back to the central test controller are conveyed firstly in the form of a particular four-digit code, which code is interpreted at a remote terminal and converted to a specific resistive signature which is conveyed back to the central test controller. The specific resistive signature is interpreted by the standard remote measurement unit located in a remote terminal.

6 Claims, 7 Drawing Sheets

*LCX-50/150 CENTRAL OFFICE TERMINAL (COT) FOR ANALOG SWITCH OR TM-50 (OC-1)/ADM-150 (OC-3) FOR DIGITAL SWITCH

NOTE: EACH (RESIDENTIAL) OPTICAL NETWORK UNIT (ONU) SUPPORTS UP TO 8 LIVING UNITS (2 POTS LINES PER LIVING UNIT)

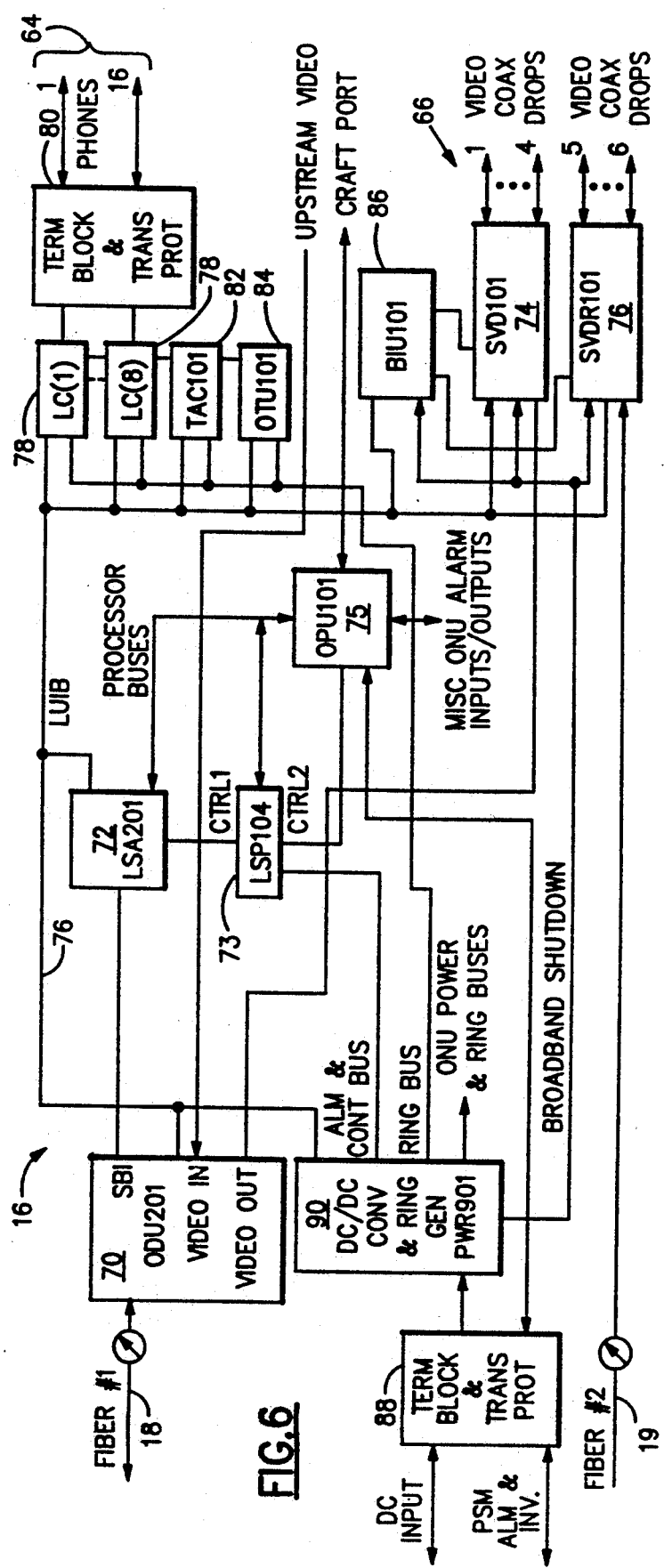

SUBSCRIBER LOOP TESTING IN A FIBER-TO-THE-CURB COMMUNICATIONS NETWORK

This is a continuation of copending application Ser. No. 07/738,102 filed on Jul. 30, 1991, now abandoned.

CROSS-REFERENCE TO RELATED APPLICATIONS

This application describes an invention which is related to a plurality of inventions covered by the following commonly assigned and in some cases co-pending U.S. patent applications: Ser. No. 351,861 filed May 12, 1989; Ser. No. 452,291 filed Dec. 15, 1989; Ser. No. 295,887 filed Jan. 11, 1989, now U.S. Pat. No. 5,014,268, issued May 7, 1991; Ser. No. 351,458 filed May 12, 1989; Ser. No. 451,419 filed Dec. 15, 1989; Ser. No. 451,436 filed Dec. 15, 1989 now U.S. Pat. No. 4,993,019 issued Feb. 12, 1991; Ser. No. 547,383 filed Jul. 3, 1990, now U.S. Pat. No. 5,027,349 issued Jun. 25, 1991; Ser. No. 616,175 filed Nov. 20, 1990; copending application entitled, "Switched Video Architecture for an Optical Fiber-to-the-Curb Telecommunications System", Ser. No. 07/738,111, filed on even date herewith; co-pending application entitled, "Efficient Feeder Fiber Loading from Distribution Fibers", Ser. No. 07/737,991, filed on even date herewith; co-pending application Ser. No. 07/739,203, entitled "Fiber Optic Link", filed on even date herewith; and co-pending application entitled, "Switched Video Distribution Apparatus and Method", Ser. No. 07/738,188, filed on even date herewith. The Disclosures of the above-mentioned applications and patents are herein incorporated by reference.

BACKGROUND OF THE INVENTION

1. Field of the Invention

The present invention relates to a system for subscriber loop testing and, more particularly, to such a system used in a telecommunications network having fiber extending to the curb. The system is designed to implement Mechanized Loop Testing (MLT).

2. Description of the Prior Art

Optical fibers are rapidly becoming the preferred means for transmission in telecommunications systems. The advantages of using optical fibers are well known and are fully accepted as being desirable. Optical fiber transmission provides exceedingly wide bandwidths which will allow for the future provision of broadband services directly to individual subscribers on a relatively universal basis. Such broadband services may include data transmission; however, there is a broader market for the distribution of video services over the telecommunications network to the vast number of residential subscribers.

There have been many proposals to provide optical fiber networks; however, in most cases the cost of providing fiber directly to the home or to remote areas of the network proved to be prohibitive. Thus, fiber has been proposed for use in feeder trunks, and even for further distribution down to some remote unit closer to the actual subscriber. At such a remote unit, the typical line cards would be used for providing twisted pair metallic drops to the actual subscriber.

Once line cards migrate to a remote unit, the cost of providing a remote test unit, as used in Digital Loop Carrier (DLC) remote housings, becomes prohibitive. A recent Bellcore Technical Advisory TA-NWT-000909 requires that certain line faults be tested for, with the results transmitted to a Remote Measurement Unit (RMU) in the form of a series of resistor signatures. Thus, any fiber optic transmission network architecture that will be commercially accepted must have provisions that satisfy this Bellcore Technical Advisory.

SUMMARY OF THE INVENTION

The present invention contemplates a system for implementing MLT testing of subscriber loops in a telephone transmission network that provides fiber-to-the-curb.

The afore-mentioned co-pending application entitled, "Switched Video Architecture for an Optical Fiber-to-the-Curb Telecommunication System" discloses a truly integrated fiber optic telecommunications system providing switched video and standard narrowband telephone services. The system is integrated, in that it transmits video services on the same fiber as the narrowband services and uses common equipment to support both services.

In said system, the feeder fiber from a Central Office (CO) services a Remote Terminal (RT) over a single fiber operating at a SONET OC-1 (51.84 Mb/s) or OC-3 (155.52 Mb/s) data rate. The RT includes Loop Carrier Cross-connect (LCX) hardware for cross-connecting and distributing DS0 channels. The system uses a star distribution network where optical fibers radiate from the RT to active Optical Network Units (ONU) located in residential areas. Each ONU serves up to eight living units, with three DS0 (64 Kb/s) channels. For residential applications, two channels are typically used for Plain Old Telephone Service (POTS), with the third channel reserved for future applications, such as the D-channel for an Integrated Services Digital Network (ISDN).

The system utilizes a Loop Carrier Cross-connect-Fiber-To-The-Curb (LCX-FTC) system, which is an advanced SONET-compliant DLC system that offers telephone companies immediate and future access to narrowband and broadband functionality. The system is designed around a family of SONET access products produced and sold by Alcatel NA Network Systems Corp., the assignee of the present invention, under product designations LCX-50 and LCX-150. The LCX-FTC system utilizes optical fibers instead of metallic lines in the local loop. The Fiber-To-the-Curb (FTC) components of the system are built upon the LCX hardware and software platforms of Alcatel to provide an easy migration to the FTC services. The system is modular by design and can be configured to accommodate many different applications.

The above-mentioned patents and patent applications which have been cross-referenced as related inventions fully describe the members of the family of access products upon which the present invention is based. Accordingly, the teachings included in these patents and patent applications are incorporated herein by reference.

The present invention uniquely provides an ONU Test Unit (OTU) located in the ONU for running the tests described by TA-909 under the control of a Line Shelf Processor (LSP) located within the ONU. The OTU operates in conjunction with a Test Access Unit (TAC) in implementing the tests. The LSP routinely initiates and runs the necessary tests. The data for all line test states is stored on a per-line basis in an LSP memory until the LSP is requested to do a line test via the normal MLT test methods. If MLT test times preclude a real-time test when a test request is received, the LSP forwards a test result code from the LSP memory to the Dual Network Controller (DNC) located in the RT. If MLT test time is available, tests will be performed when a test request is received, and the results will be forwarded by the LSP to the DNC via a code. The test code instructs the DNC to place a specific resistive signature across the Test Access Path (TAP) of the RT's RMU. Upon seeing this signature, the RMU reports back to the test head the particular condition that was encountered on the line.

During the process the RMU does its normal tests on the TAP and forwards the results to the test head. When the RMU sees the specific signature it reports this back to the test head, which then knows a remote test is being reported, as opposed to a local metallic subscriber pair. During this process, normal channel testing is being performed by the Pair Gain Test controller (PGTC) in the COT over the OC1/OC3 fiber to the RT, over the fiber to the ONU to the line card being tested, with the MLT test terminations and voltage/signaling state recognition circuitry provided by the TAC card working in conjunction with the OTU. The OTU will be capable of measuring not only MLT testable lines but also the presence of ISDN NT1 units and MDUs.

It is a primary objective of the present invention to provide for MLT testing of subscriber loops in an optical fiber network providing fiber-to-the-curb.

It is another objective of the present invention to provide subscriber loop testing satisfying Bellcore's Technical Advisory TA-NWT-000909.

DESCRIPTION OF THE DRAWINGS

FIG. 6 is a block diagram of an ONU.

DETAILED DESCRIPTION OF THE PRESENT INVENTION

Figure 1:
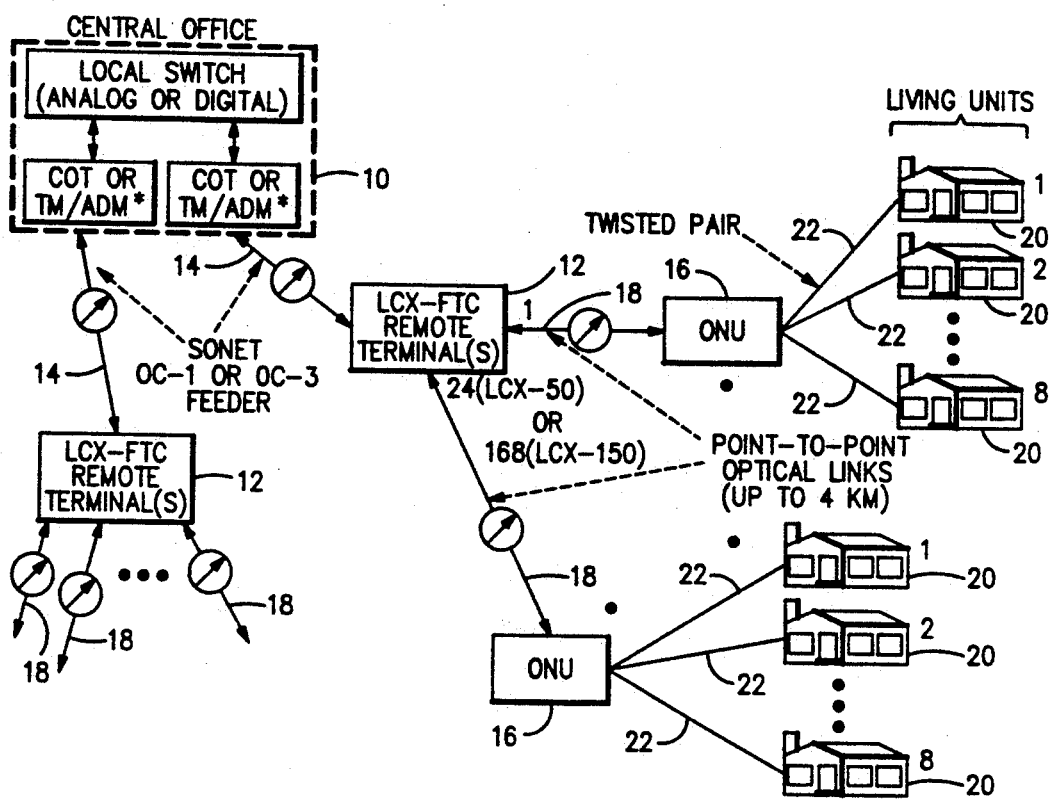
FIG. 1 is a block diagram of a basic narrowband FTC architecture which can be upgraded to provide broadband service.

Referring to FIG. 1 there is shown a CO 10 connected to remote terminals 12 via SONET OC-1 or OC-3 optical feeders 14 which function as a digital transport link therebetween. The carrier rate used for transport depends upon the current and anticipated channel capacity required. The CO 10 may include either an LCX-50 or LCX-150 Central Office Terminal (COT) for UDLC arrangements or a TM-50 or ADM-150 for IDLC arrangements. The UDLC system is suited for COs with an analog switch using metallic line shelves to provide the analog interface to the switch. The IDLC system arrangement provides a DSX-1 interface with TM-50 or ADM-150 units for COs using a digital switch. Both TR-8 and TR-303 digital interfaces are supported by the LCX-FTC system. An LCX-50 core provides the platform for OC-1 rate transmission and an LCX-150 core will provides a platform for OC-3 rate transmission. The structures necessary for the TM-50 and ADM-150 units are similar to those disclosed in the aforementioned U.S. patent application, Ser. No. 351,861 filed May 12, 1989 and the structures for LCX-50 and LCX-150 cores are disclosed in U.S. patent application, Ser. No. 452,291, filed Dec. 15, 1989.

The telecommunications system uses a star distribution network where the optical fibers radiate from the RTs 12 to active ONUs 16 via point to point optical distribution links 18. Each LCX-50 equipped RT 12 can serve up to 24 or 28 ONUs, depending on whether broadband service is being offered. The RT serves the ONUs through optical links 18. When the RT is equipped with an LCX-150, 168 ONUs can be served with narrowband and broadband services. Each ONU 16 can service up to eight living units or homes 20 and is connected thereto through the use of metallic twisted pairs or coaxial drops 22 depending on the service required in each living unit. Typically each living unit will be provided with three DS0 channels, two channels for providing (POTS) and a third channel reserved for future applications such as the D-channel for ISDN.

Figure 2:
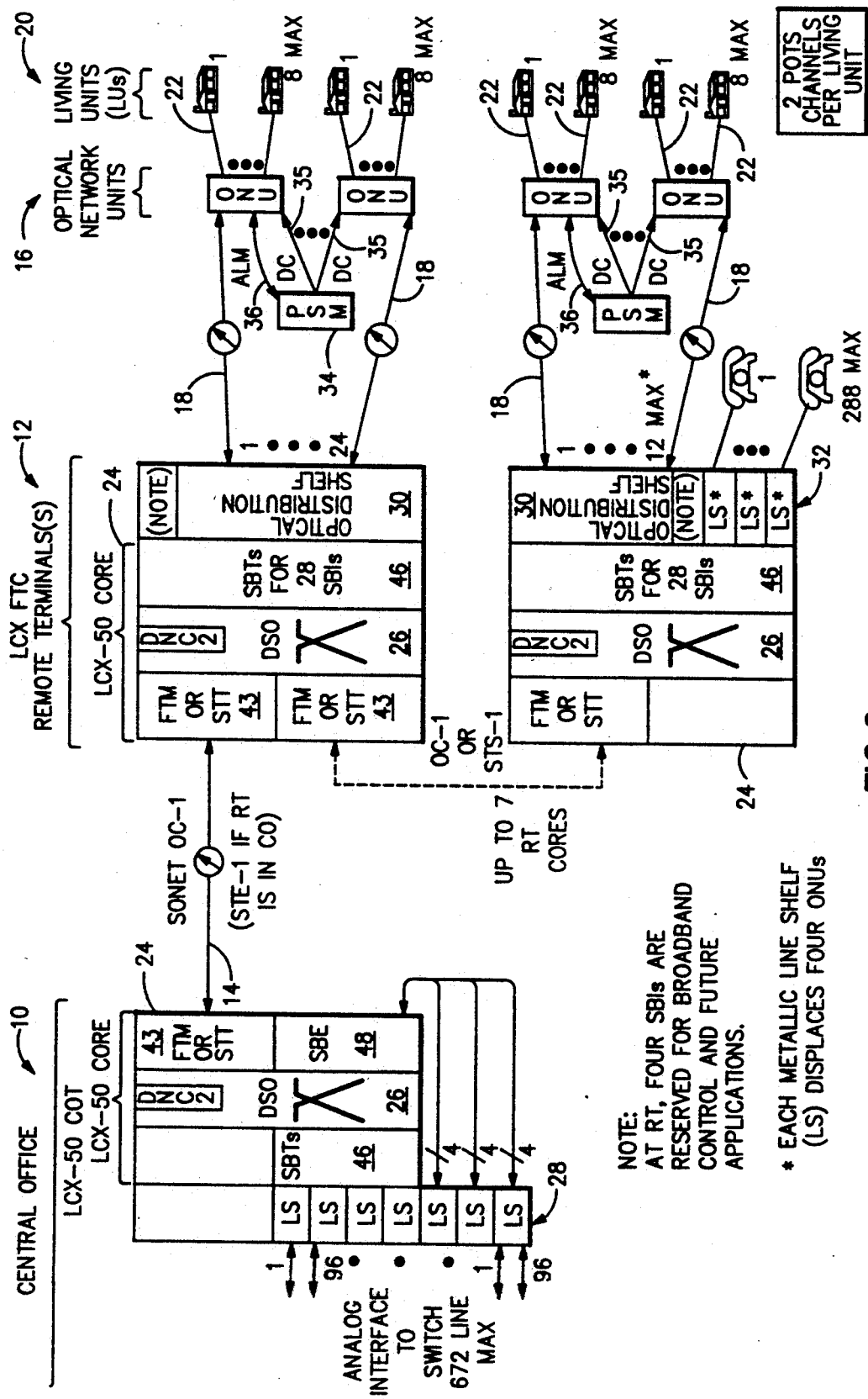
FIG. 2 is a block diagram illustrating one embodiment of the overall system of the present invention.

Referring to FIG. 2 there is shown greater detail of the LCX-50 core 24 as used in the CO 10 and RT 12. The LCX-50 core 24 utilizes a non-blocking switch fabric in the form of a time slot interchanger 26 which allows for switching of the various subscriber channels. In the RT 12 the time slot interchanger 26 allows the subscriber channels from ONUs 16 to be loaded and groomed over the RT to CO feeder 14 for optimum capacity and ease of administration. As shown in FIG. 2 several RT cores 24 can share the same feeder 14 to provide a distributed arrangement for additional flexibility and channel density. The ability of the RT to groom and reassign subscriber channels to different time slots allows more flexibility in the planning and placement of ONUs. The time slot interchanger 26 utilized in the core is constructed as shown in U.S. patent application Ser. No. 295,887 filed Jan. 11, 1989, which is incorporated herein by reference.

The configuration shown in FIG. 2 is adapted for use with a voice-grade analog switch interface and is thus a UDLC system based on a LCX-50 core. It is to be understood that a LCX-50 core can also support a system for use with an IDLC configuration and that the LCX-150 core could be used in an IDLC configuration that provides TR-303 compatibility.

The system shown in FIG. 2 includes a COT in CO 10 and a RT 12 having a plurality of cores 24 connected to the COT via a SONET OC-1 feeder 14. Optical distribution links 18 extend to the ONUs 16. Interface to the analog switch is provided by metallic line shelves 28 which accommodate channel unit plug-ins to perform the analog/digital conversions on the transmission signal and present voice frequency and baseband interfaces to the switching system. Up to seven line shelves 28 can be serviced by an LCX-50 core 24, with each line shelf providing 96 subscriber lines, for a total of 672 lines. When CO 10 is updated to a digital switch providing an integrated TR 303 interface, the LCX-FTC system can easily be upgraded to the new digital switching environment.

In the RT 12, the core 24 is connected to an Optical Distribution Shelf (ODS) 30 which provides the housing for plug-in electronics that provide the fiber optic interfaces to the ONUs. The ODS 30 is used in place of the metallic line shelves 28; however, if some metallic lines are terminated at the RT 12, up to three shelves may be equipped for metallic lines, as shown at 32. However, each metallic line shelf reduces the number of ONUs served by the ODS by four. A fully-equipped ODS has positions for 28 optical interfaces; however, only 24 are used for residential applications.

The residential ONUs 16 are sealed enclosures contemplated for use in a neighborhood right-of-way near the subscriber residence that it serves. The ONU provides electronics that perform the optical/electrical conversions required and also houses channel plug-in units that provide the narrowband interface to the living units. The narrowband channel plug-in units utilized in the ONU are substantially identical to those used in the LCX-50 metallic line shelves.

In many instances, a living unit containing customer premises equipment may be connected directly to the CO 10 without the need of a digital loop carrier system, such as the feeder link between RT 12 and CO 10. In such instances the equivalent of RT 12 would be co-located with the CO equipment. When the RT is co-located in the CO, economical electrical STS-1 connections may be used in place of the optical OC-1 feeder.

In FIG. 2, there is shown a Power Services Module (PSM) 34 associated with groups of ONUs 16. The PSM 34 is a free-standing cabinet designed to provide power to the active elements contained in the ONUs. Alarm connections 36 are also provided between the PSM and an ONU for providing alarm signals back to the RT or CO in the event of a failure in the PSM 34.

It should be noted that up to seven LCX-50 cores 24 may be connected together in one RT, utilizing OC-1 or STS-1 interconnections. Switched video signals may be provided to the ODS 30 in each LCX-50 core 24.

Figure 3:
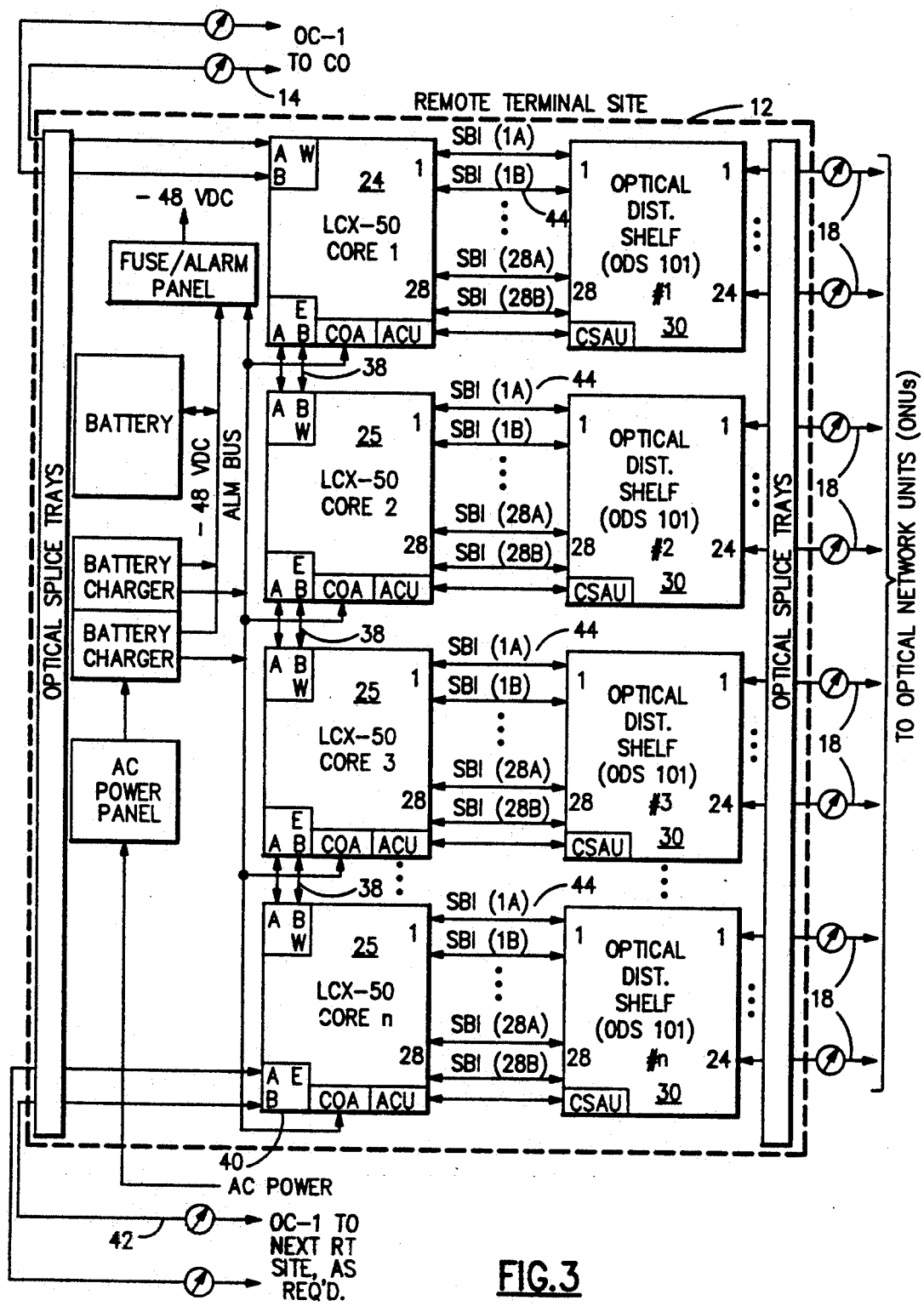
FIG. 3 is a block diagram showing a remote terminal of an LCX-FTC equipped for narrowband service.

FIG. 3 shows an arrangement wherein an OC-1 feeder 14 from the CO 10 is terminated at one LCX RT core 24, with additional LCX RT cores 25 interconnected with electrical STS-1 high-speed links 38. With this type of add-drop arrangement, the timeslots or channels in the OC-1 feeder 14 from the CO can be efficiently utilized, even when the channel capacity of all ONUs is not fully utilized. The last LCX RT core 25 in the add-drop string of cores may be equipped with an FTM-OC1 interface 40 to continue the string of cores to another RT site via another OC-1 feeder 42.

The ODS 30 is responsible for providing an interface between the LCX RT core 24 and the distribution fibers 18 to the ONUs 16. The transport and control connections between the LCX RT cores 24 and 25 and the ODS 30s are via 4 Mb/s balanced serial bus links referred to as Serial Bus Interfaces (SBI) 44. The SBI is an internal electrical bus used in the SONET access products of Alcatel and is fully described in the afore-mentioned U.S. patent application Ser. No. 351,458, filed May 12, 1989, which is incorporated herein by reference. The SBI includes a usable payload of 24 DS0 channels or one DS1 signal. The SBI is uniquely used to supply the distribution fibers 18 for the local loops. The narrowband optical signal transmitted over distribution fibers 18 is also at a 4Mb/s serial data link, and is essentially an optical extension of the SBI.

It should be noted that the OC-1 feeder line 14 is redundant and comprises lines A and B, said redundancy is carried through the LCX-50 core and also in the SBIs 44 which are also shown as A and B SBIs. It should be further noted that in FIG. 2, there are provided fiber optic transceivers (FTM) 43, which may be replaced by STS-1 electrical transceivers (STT) if the feeder line is an electrical STS-1 line, as opposed to an optical carrier. In addition, the LCX-50 cores include Serial Bus Transceivers (SBT) 46 for interfacing with the SBIs 44. The LCX-50 core 24 located within the CO 10 also includes a Serial Bus Expansion unit (SBE) 48 to facilitate connection to additional line shelves 28.

Figure 4:
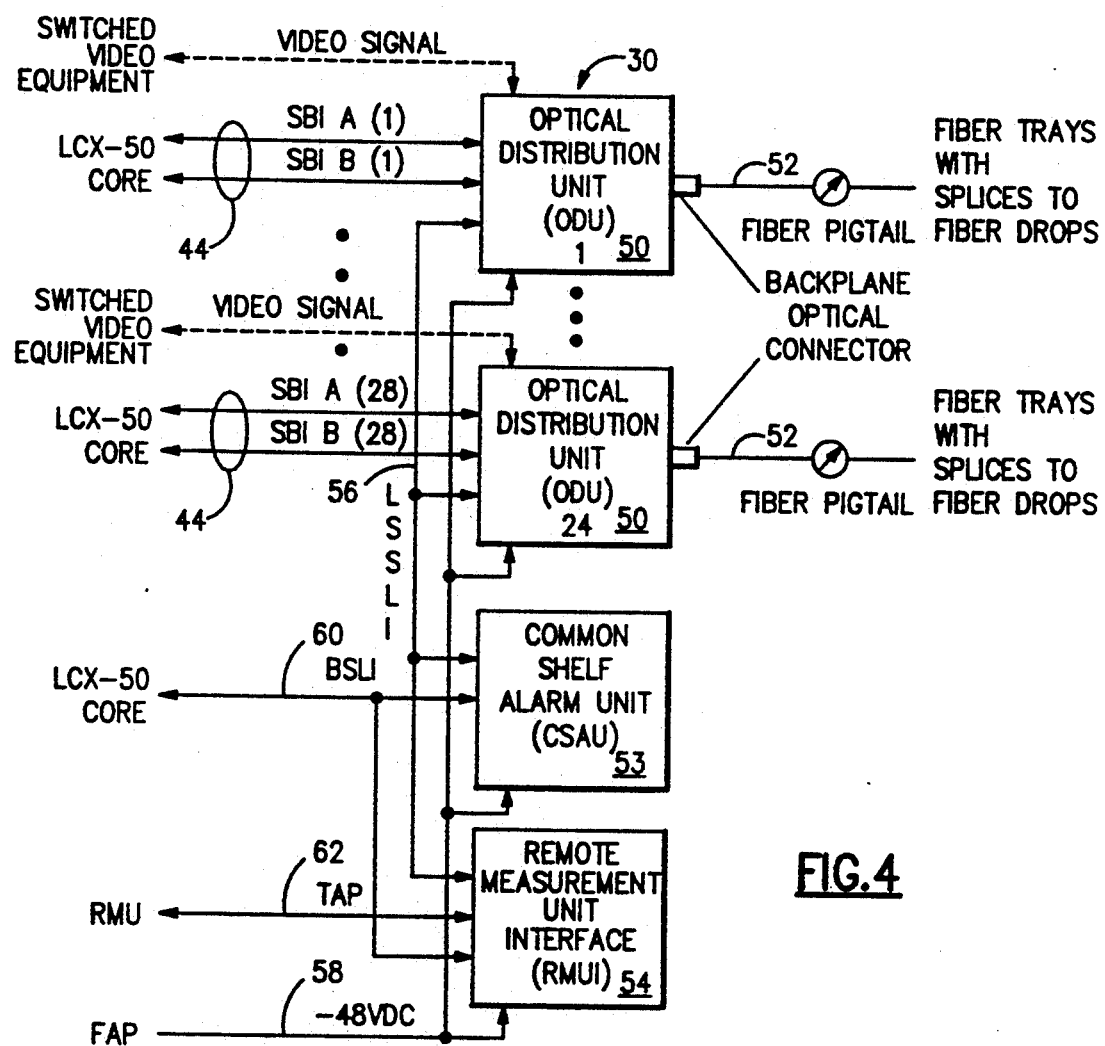
FIG. 4 is a block diagram of an optical distribution shelf as shown in FIG. 3.

Referring to FIG. 4, there is shown greater detail of the ODS 30 used with the cores 24 of the RT 12. The ODS 30 is used in place of up to seven metallic line shelves and provides for the optical connection to the ONUs 16. The ODS includes, for residential purposes, 24 Optical Distribution Units (ODU 101) 50, each connected with a fiber pigtail 52 for connection to the distribution fibers 18. Each ODU 50 is connected to the LCX 50 core 24 via a pair of redundant SBIs 44. The ODU 50 essentially performs an electro-optical conversion of the electrical SBI signal to an optical SBI signals. The ODU 50 is also adapted to receive switched video signals from broadband equipment and to Frequency Division Multiplex the video signals with the SBI signals, which will be described hereinafter.

Each ODS 30 is further provided with a Common Shelf Alarm Unit (CSAU) 53. A Remote Measurement Unit Interface (RMUI) 54 may be provided in the ODS, only one RMUI is necessary per RT. The components of the ODS 30 are interconnected by a Low-Speed Serial Link Interface (LSSLI) 56 and receive power via a line 58. A Balanced Serial Link Interface (BSLI) 60 connects the CSAU 53 and the RMUI 54 with the LCX-50 core. A line 62 connects the RMUI 54 with the remote measuring unit and functions as a Test Access Path (TAP).

Figure 5:
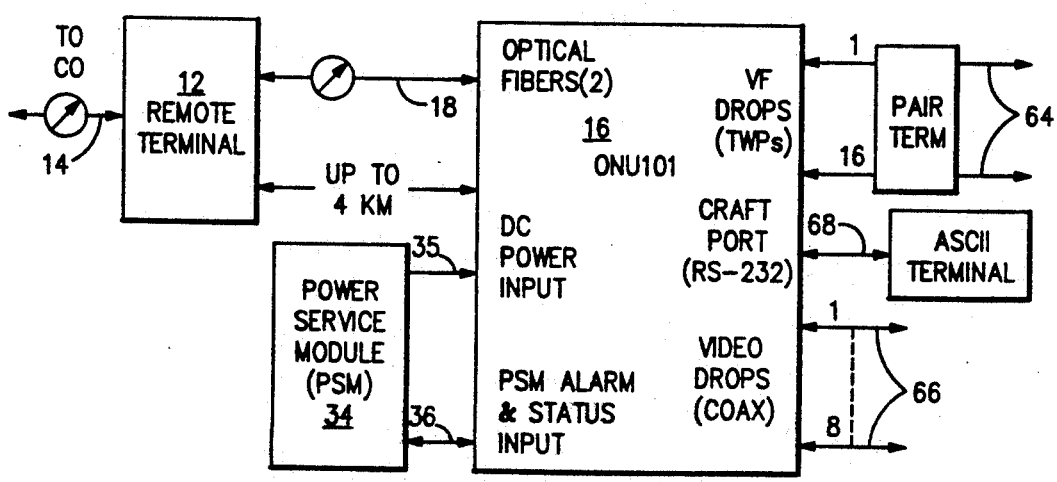
FIG. 5 is a block diagram showing how an ONU fits into the overall system.

Referring to FIG. 5, there are shown details of how an ONU 16 fits into the overall system. Two optical fibers 18, one active and one spare, are received from RT 12. The active fiber carries narrowband and broadband signals, while the spare fiber is provided to carry broadband video service to any additional living unit over four units provided with video service. The narrowband and broadband signals on the active fiber are combined at the RT using Frequency-Division Multiplexing (FDM). The spectrum from 0–50 MHz is reserved for narrowband data, while the broadband signal occupies the spectrum from 60–780 MHz.

The ONU 16 can serve up to eight living units, with three DS0 channels available per living unit. For each living unit, two subscriber drops, typically used for POTS, are available, with the third DS0 channel reserved for future applications, such as the D-channel for ISDN. The POTS subscriber drops are provided at outputs 64 and are represented by 16 twisted wire pairs. The third DS0 channel output is not shown in FIG. 5; however, in ISDN all three DS0s are provided over a single twisted pair.

The ONU also provides video coax cable drops 66 for subscriber access to high-quality broadband signals. It is contemplated that a business ONU will provide more channel capacity and services per ONU than the residential ONU shown in FIG. 5. The ONU 16 receives its power from the PSM 34 over line 35 at a nominal voltage of −130 VDC. Line 36 connects the power service module 34 with the ONU 16 to provide PSM alarm, status and inventory information. Line 36 is only used between the PSM 34 and up to two ONUs if redundancy is desired, it is not needed for all ONUs. The ONU is also provided with an output 68 as a craft port for an RS-232 connection. If desired, the −130 VDC power could be provided from a local power source, such as residential power.

Referring to FIG. 6, there is shown a more detailed block diagram of an ONU 16. The integrated narrowband and broadband signal is received from the RT 30 over a distribution fiber 18 which is connected to an Optical Distribution Unit (ODU 201) 70. The ODU 70 converts the optical signal to an electrical signal and includes a lowpass filter which separates out the narrowband signal from the integrated signal. The narrowband signal is in the form of an encoded serial bus interface (SBI) data stream, which signal is sent to a Line Shelf Access (LSA) 72 which functions to distribute the signal to various time slots assigned to cards inserted in the line shelf portion of the ONU. The broadband video is filtered from the electrical signal and then sent to a Switched Video Distribution (SVD) card 74. The SVD 74 provides video coax drops 66 to four living units 20 requiring video service. When more than four living units are to be serviced with video, a second distribution fiber 19 must be utilized and is connected to a Switched Video Distribution Receiver (SVDR) 76, which provides video coax drops 66 for four additional living units 20.

The ODU 70 has a video input for receiving upstream video from the living units 20.

Many of the components of the ONU 16 are substantially identical to the standard metallic line shelf components utilized in the Alcatel Access Products and are described in the afore-mentioned U.S. patents and patent applications. The LSA 72 is described in U.S. patent application Ser. No. 452,291, filed Dec. 15, 1989, which application also describes the Line Shelf Processor (LSP) 73, said application being incorporated herein by reference. In the present invention, the LSP 73 has additional control functions due to the video distribution handled by the ONU, the remote testing and the craft interface features at the ONU. The LSA 72 is connected to most components of the ONU via a Line Unit Interface Bus (LUIB) 76. The LUIB is described in detail in U.S. patent application Ser. No. 451,436, filed Dec. 15, 1989 and is incorporated herein by reference.

The narrowband metallic DS0 service is provided by line cards 78 which are connected to a terminal block 80 for connection to twisted pairs 64 to be provided to the living units 20. A standard Test Access Unit (TAC) 82 is connected to an ONU Test Unit (OTU) 84 for test purposes. A Broadband Interface Unit (BIU) 86 is provided for controlling the distribution of the broadband signals. A terminal block 88 is provided to receive the DC power input and the alarm information from the PSM 34. Terminal block 88 is connected to a DC/DC converter and ring generator 90 which provides ring signals, DC operating voltages, alarm and control information.

An ONU Port Unit (OPU) 75 provides an RS-232C craft port for provisioning channel units or to logon to the RT DNC. The OPU collects local ONU alarms and provides an alarm communications interface between the PSM 34 and the CO 10.

Figure 7:
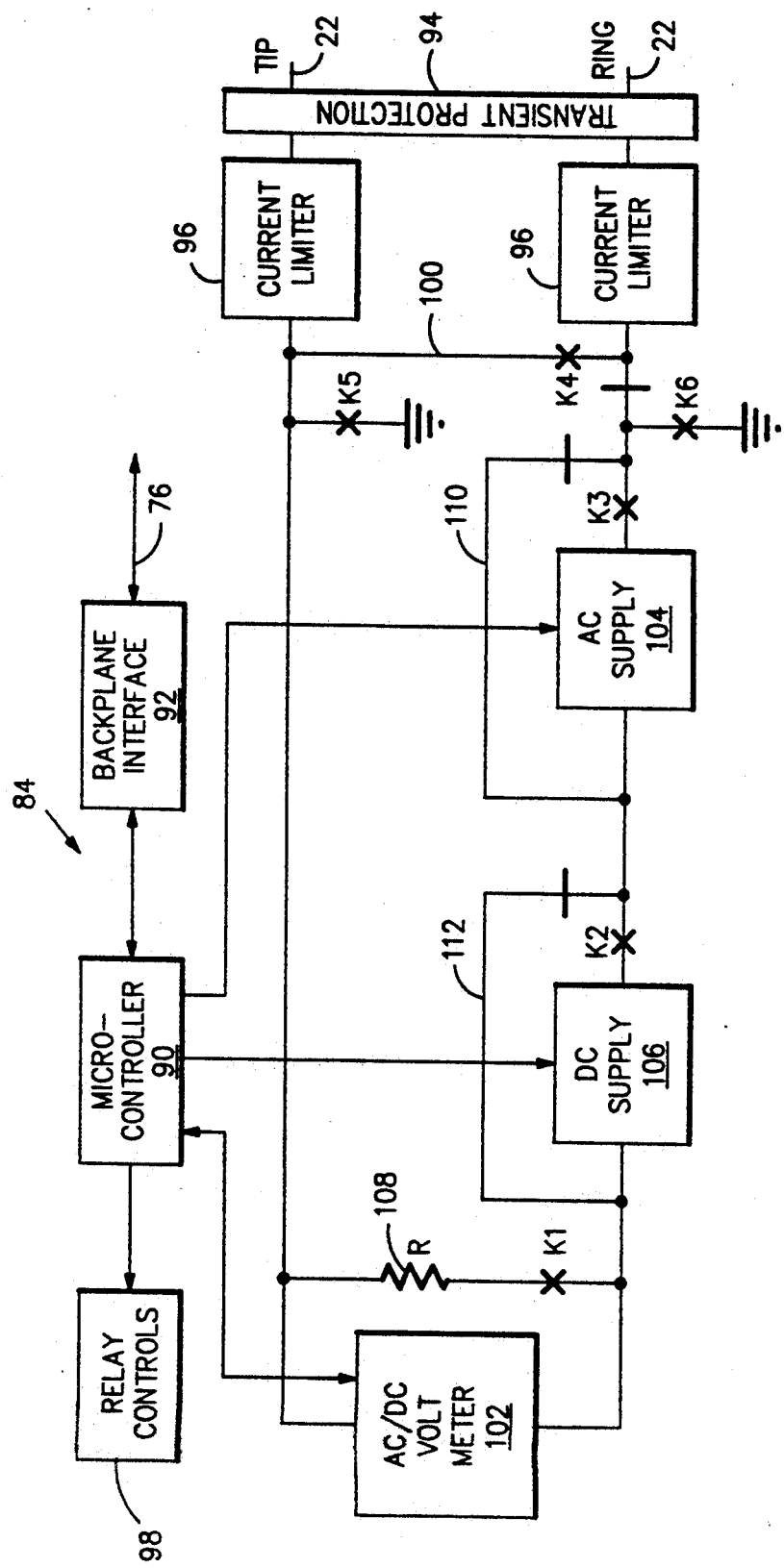
FIG. 7 is a block diagram of the ONU Test Unit.

Referring to FIG. 7, there is shown a block diagram of the OTU 84, which is used to implement the TA-909 tests. The OTU includes a microcontroller 90 connected to a backplane interface 92 which connects to the LUIB 76, which functions as a high-speed serial bus to provide communication between microcontroller 90 and the LSP 73. The microcontroller 90 functions as a slave unit responding to system commands and queries, and it is not able to interrupt the system. The OTU connects to the tip and ring lines of metallic pair 22 through a transient protection component 94, which protects against lightning and power faults. Both the tip and ring lines pass through current limiters 96 which function to limit the current when performing three terminal FEMT tests. During these tests, tip and ring are either shorted to ground or together.

A plurality of relays K1-K6 are controlled by the microcontroller 90 operating through the relay control block 98. The relay control block 98 contains the relay drivers and coils necessary to control the relays in various switching devices K1-K6.

After passing through the current limiters 96, the tip and ring lines may be shorted by a line 100 in which contacts of relay K4 are located. The lines may also be shorted to ground by the contacts of relays K5 and K6. The tip line continues to one end of an AC/DC voltmeter 102, while the ring line passes through an AC supply 104 and a DC supply 106, after which the ring line is connected to an opposite end of the AD/DC voltmeter 102. The volt meter 102, AC supply 104 and DC supply 106 are connected to the microcontroller 90 and are controlled thereby. The microcontroller functions to read and store the readings of the AC/DC voltmeter 102. A resistor 108 is connected across the tip and ring lines and has inserted in the connection the contacts of relay K1.

A bypass 110 is provided around the AC supply 104 and is inserted by the action of the contacts of relay K3. In like manner, a bypass 112 is provided around the DC supply 106 and is inserted by the contacts of relay K2.

The AC supply is a 24 Hz source superimposed on 45 or 70 volts to measure AC impedance in the Presence of Ringer Test. The DC supply 106 is a floating supply capable of three different voltage levels: 10 volts for measuring resistance below the turn-on threshold of the MTU or NT1; 45 volts for measuring resistance above the turn-on threshold of the MTU or NT1; and 70 volts for measuring the reverse bias signature of the MTU.

The AC/DC voltmeter measures and reports the voltage appearing across it. For FEMF measurements, relays K2 and K3 will bypass the DC and AC supplies, and the voltmeter will measure the voltages appearing at tip and ring, depending upon the state of relays K4, K5 and K6. For DC and AC resistance measurements, the K2 and K3 relays will enable the DC and AC supplies, and relay K1 will insert resistor R, the current measuring resistance. The voltmeter will report the voltage drop across resistor R, which will be converted to current by the microcontroller.

Table 1 illustrates the state of the relays and power supplies shown in FIG. 7 during the various tests set forth in the Table.

TABLE I

| TEST | K1 | K2 | K3 | K4 | K5 | K6 | DC | AC |
|---|---|---|---|---|---|---|---|---|
| FEMF | Off | Off | Off | X | X | X | Off | Off |
| Resistive Faults | On | On | Off | X | X | X | On | Off |
| ROH | On | On | On | Off | Off | Off | On | Off |
| Ringers | On | On | On | X | X | X | On | On |
| MTU | On | On | On | Off | Off | Off | On | Off |
| NT1 | On | On | On | Off | Off | Off | On | Off |

Note: X means that the relay follows a three-terminal test sequence.

The various tests that are performed are the Foreign ElectroMotive Force (FEMF), Resistive Faults, Receiver Off Hook (ROH), Presence of Ringers, Maintenance Terminal Unit and Network Termination Unit. Other tests can be accommodated in the future as the need arises, with resistive signatures reserved for future use. The details of these tests may be found in the Bellcore Technical Advisory TA-NWT-000909, which is incorporated herein by reference.

Figure 8:
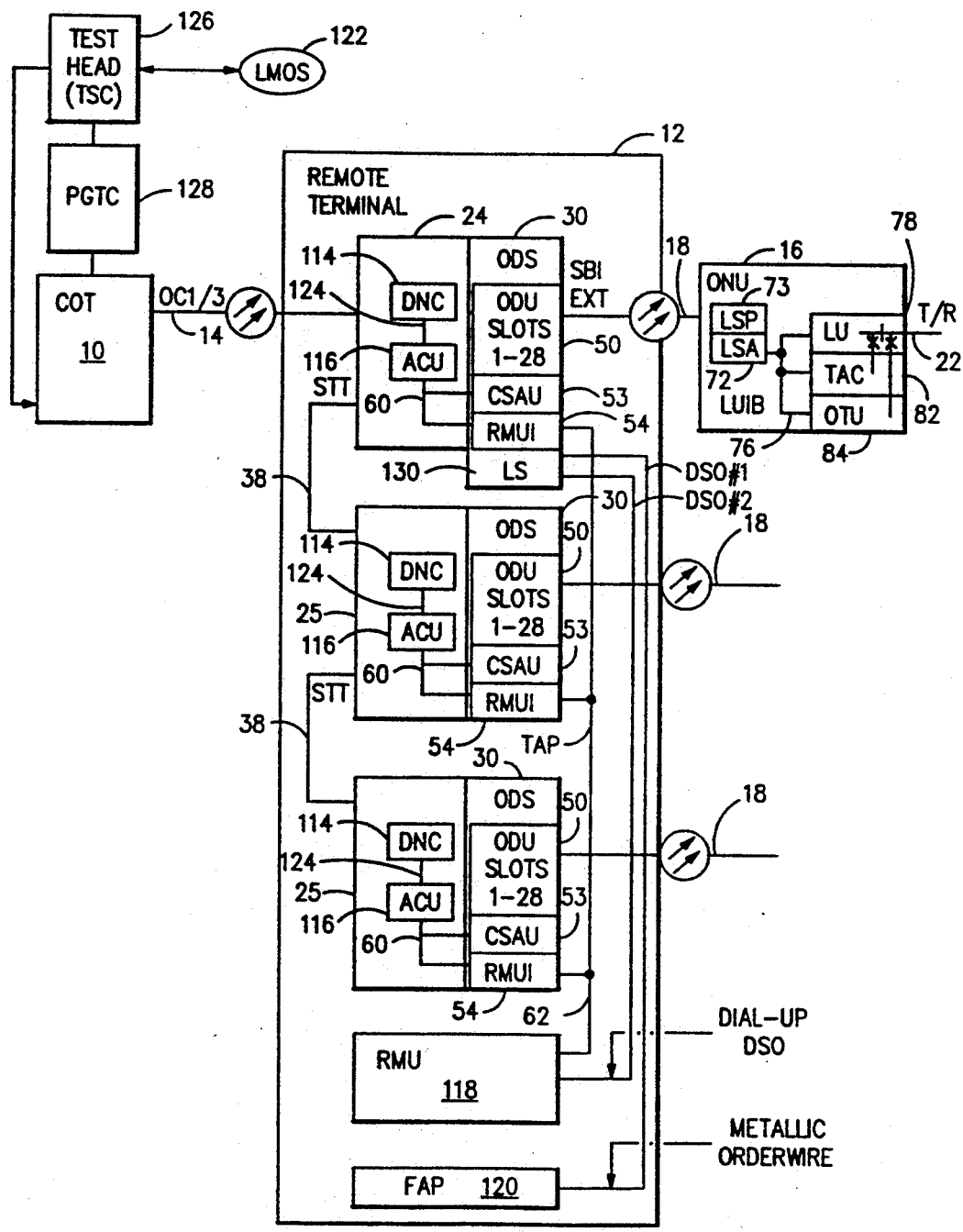
FIG. 8 is a block diagram illustrating the components used for implementing MLT subscriber loop testing.

Referring to FIG. 8, there is illustrated the components required to implement the MLT testing of subscriber loops. The RT 12 includes many of the previously-discussed components, the functions of which may be further discussed hereinbelow. The RT 12 includes a number of cores 24 and 25, each core includes a Dual Network Controller (DNC) 114 and an Alarm Control Unit (ACU) 116. The RT 12 also includes a Remote Measurement Unit (RMU) 118 and a Fuse and Alarm Panel (FAP) 120.

The RMUI 54 located in each ODS 30 is used for implementing the testing specified in TA-NWT-000909. When the network demands a drop test, the DNC 114 commands the RMUI to bridge the TAP of the RT with a resistive signature. These resistive signatures correspond to status conditions for the line being tested in the ONU. The RMU 118 reports these values to a Loop Maintenance Operating System (LMOS) 122, which interprets the test condition.

Communication from the DNC 114 to the RMUI 54 is through the ACU 116 which interfaces the DNC through a Multiprocessor Serial Interface (MSI) bus 124. The MSI 124 is a transistor-transistor logic level bus operating at 128 Kbps. The ACU 116 converts the signal from the DNC 114 to a Balanced Serial Link Interface (BSLI) format which is transmitted on bus 60 to the CSAU 53 and the RMUI 54.

The RMUI 54 uses the LSSLI bus 56 shown in FIG. 4 to send alarm, status and inventory data to the CSAU 53.

The CSAU 53 essentially provides the interface between the DNC 114 and the various units located in the ODS 30. As previously mentioned, the CSAU retrieves alarms, status and inventory data from the units of the ODS 30 and relays this information to the DNC 114. The DNC 114 communicates with components of the core 24 over the MSI 124, which connects to the ACU 116, which is connected to the CSAU 53 through the BSLI bus 60. The CSAU 53 uses the LSSLI 56 to communicate with the other units of the ODS 30.

With the assistance of the above-mentioned components, the MLT subscriber loop tests may be performed as follows: The LSP 73 will run routine periodic tests on all lines in its ONU 16 using the line card relays, the TAC 82 and the OTU 84. The tests run are those detailed in TA-909 in a specific priority sequence under control of the LSP 73. The LSP controls the line unit 78, TAC 82 and OTU 84 via the LUIB 76. If a line scheduled for routine tests is busy, it will not be accessed, but its last test state will be kept in the memory of the LSP 73. The data for all line test states are stored in the LSP memory until the LSP is requested to do a line test via the normal MLT test methods. When this happens, the normal channel testing proceeds, i.e., Pair Gain Test Controller (PGTC) 128 to COT 10 to RT 12 to ONU 16 to TAC 82. If the time to report the test is lengthened in the MLT sequence, the actual testing will be done when commanded, rather than routinely done in a background mode at the ONU. The test result would then not need to be stored, but immediately forwarded from the OTU to LSP to DNC. Meanwhile, the LSP 73 forwards a code to the DNC 114 in the associated core 24 over the VI channel of the SBI 18 using techniques as disclosed in U.S. patent application Ser. No. 547,383, filed Jul. 3, 1990, now U.S. Pat. No. 5,027,349, which is incorporated herein by reference. The LSP code tells the DNC 114 to place a specific resistive signature across the TAP 62 of the RMU 118. This same TAP is used for both metallic measurements of lines originating from the RT and for signature recognition. The resistive signature is placed across the TAP 62 using a control path through the ACU 116 and the RMUI 54, as previously discussed. Upon seeing this signature, the RMU 118 reports back to the test head (TSC) 126 the parameters of the line/signature that were encountered on the line which was tested and the LMOS 112 interprets the condition received by the TSC 126. Only one failed signature is applied, that signature being the first test failed, since the OTU goes through its tests on a priority basis.

In order to implement the tests, a pair of simple POTS metallic pairs (DS0 #1 and DS0 #2) must be available in the RT. These pairs may be provided by using a line shelf 130 in one of the cores of the RT 12, or two pairs could be brought in from a closely located ONU 16. One pair is used as the DS0 interface required for the RMU control path and is shown as the dial-up DS0 in FIG. 8, while the other pair may be used for orderwire purposes at the FAP for possible connection to a craft head set. Each pair must have a telephone number. A metallic distribution unit (MDU) could occupy any ODU slot in the ODS, could be used to obtain two metallic pairs in an all-fiber RT.

Thus, the present invention provides the circuitry necessary to implement MLT testing of subscriber loops, even when fiber is used in the network directly to a curbside location. The invention satisfies the requirements of Bellcore Technical Advisory TA-NWT-000909 and performs the required tests.

What is claimed is:

1. An apparatus for performing mechanized loop testing in a optical fiber telecommunications network having optical transmission lines extending from a central office test controller to a remote terminal and from the remote terminal to a network unit located in the neighborhood of the subscribers, said apparatus comprising:

test means in the network unit, responsive to a start test command signal, for performing selected mechanized loop tests on subscriber lines at the network unit and for providing a test results signal;

controller means located in the network unit for starting the selected tests by providing the start test command signal to said test means and responsive to the test results signal from the test means for storing the test result signals, said controller means being responsive to test request signals transmitted from the central office test controller for providing a specific code identifying the stored test results to the remote terminal; and means located within the remote terminal responsive to the code received from the controller means in the network unit for providing a specific resistive signature indicative of the stored test results to the central office test controller, where the specific resistive signals is recognized in the central office test controller as a specific test result.

2. An apparatus as described in claim 1, wherein the remote control terminal includes:

a dual network controller for receiving the code from the controller means;

a remote measurement unit interface responsive to a signal from the dual network controller for placing the specific resistive signature on a test line; and a remote measurement unit monitoring the test line to identify the specific resistive signature and convey the test results to the central office test controller.

3. A method for performing mechanized loop testing in an optical fiber telecommunications network having optical transmission lines extending from a remote terminal to the subscriber's neighborhood, said method comprising the steps of:

at a network unit located in the neighborhood, routinely conducting tests on the subscriber lines and storing said test results in a processor memory;

in response to a central office requested test, transmitting the routinely conducted, stored test results from the memory to the remote terminal;

in response to a craft request to initiate a test, running the craft requested test and providing the test results at the network unit for craft use.

4. A method as described in claim 3, wherein the stored test results are conveyed to the remote terminal as a specific coded test result and additionally comprising the steps of:

interpreting code received for the network unit, in the remote terminal, and in response thereto placing a specific resistive signal on a test line in the remote terminal; and monitoring the test line, in the remote terminal, to recognize the specific resistive test results and forwarding said test results to a central office test controller.

5. A method for performing mechanized loop testing in an optical fiber telecommunications network having optical transmission lines extending to the subscriber's neighborhood, said method comprising the steps of:

at a network unit located in the neighborhood, routinely conducting tests on the subscriber lines and storing said test results in a processor memory;

in response to a request to initiate a test, transmitting stored test results from the memory to the remote terminal, wherein the test results are conveyed to the remote terminal as a specific coded test result and additionally comprising the steps of:

interpreting the code received from the network unit and, in response thereto, placing a specific resistive signature on a test line; and monitoring the test line to recognize the specific resistive test results and forwarding said test results to a central test controller.

6. The method of claim 5, further comprising the steps of:

at the network unit, in response to a craft request to initiate a test, performing the craft requested test; and providing a test results signal at the network unit for craft display.

* * * * *

UNITED STATES PATENT AND TRADEMARK OFFICE
CERTIFICATE OF CORRECTION

PATENT NO. : 5,301,050

DATED : April 5, 1994

INVENTOR(S) : Czerwiec et al

It is certified that error appears in the above-indentified patent and that said Letters Patent is hereby corrected as shown below:

On the title page, Item [54]: Title, change "COMMUNICATIONS" to --TELECOMMUNICATIONS--.

Abstract, line 2, prior to "fiber", insert --an optical--.

Column 10, line 65, change "signals" to --signature--.
Column 10, line 68, delete "control".
Column 11, line 30, change "signal" to --signature--.

Signed and Sealed this

Second Day of August, 1994

Attest:

BRUCE LEHMAN

Attesting Officer    Commissioner of Patents and Trademarks